No. 831,211. PATENTED SEPT. 18, 1906.
J. E. BUCKINGHAM, Jr.
FISH HOOK.
APPLICATION FILED APR. 21, 1906.

Witnesses

Inventor
J. E. Buckingham, Jr.
by
Attorneys

UNITED STATES PATENT OFFICE.

JOHN E. BUCKINGHAM, JR., OF WASHINGTON, DISTRICT OF COLUMBIA, ASSIGNOR OF ONE-HALF TO R. M. MULLETT, OF WASHINGTON, DISTRICT OF COLUMBIA.

FISH-HOOK.

No. 831,211.   Specification of Letters Patent.   Patented Sept. 18, 1906.

Application filed April 21, 1906. Serial No. 313,084.

*To all whom it may concern:*

Be it known that I, JOHN E. BUCKINGHAM, Jr., a citizen of the United States, residing at Washington, in the District of Columbia, have invented certain new and useful Improvements in Fish-Hooks; and I do declare the following to be a full, clear, and exact description of the invention, such as will enable others skilled in the art to which it appertains to make and use the same.

My invention relates to improvements in fish-hooks, and more particularly to means for protecting the silk or other wrapping which binds or lashes the hook to the usual gut snell or to a leader, line, or the like.

The object of the invention is to protect this wrapping from being cut or severed by the teeth of a fish upon the hook, so that the latter will not pull loose from the snell, leader, line, or the like to which it is connected by the wrapping, and I preferably accomplish this object by providing upon the wrapping a protecting casing or covering in the form of a rubber tube or sleeve secured in position by a waterproof cement.

The above and other objects are accomplished by the construction set forth in the following specification and illustrated in the accompanying drawings, in which—

Figure 1:
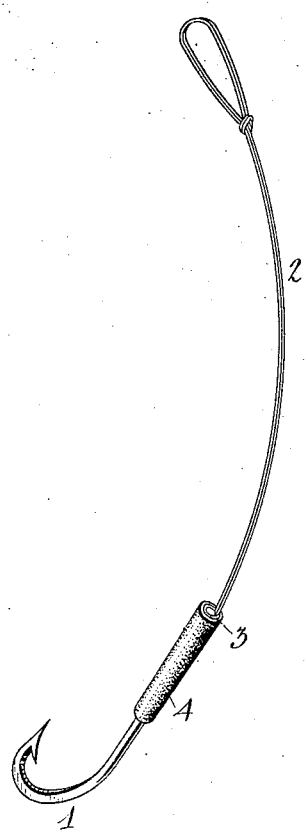
Figure 2:
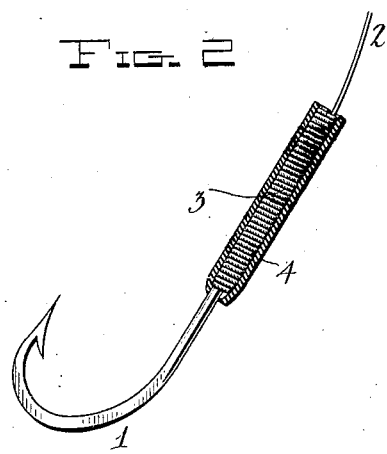
Figure 3:
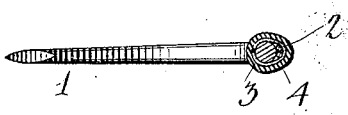

Figure 1 is a perspective view of a gut-snell fish-hook having my improvements applied thereto. Fig. 2 is a longitudinal sectional view, on an enlarged scale; and Fig. 3 is a transverse sectional view.

Referring to the drawings by numerals, 1 denotes a fish-hook, 2 the usual gut snell or snood, 3 the usual silk or cotton thread wrapping which lashes the hook upon the gut strands, and 4 my improved shield or protector for the wrapping 3. I preferably employ a piece of rubber tubing of suitable length and shape. This rubber tube or sleeve is preferably secured in position by a waterproof cement; but any other suitable fastening means may be employed for retaining it over the lashing or wrapping 3, and thereby protecting the same from the teeth of any fish that may be caught upon the hook. This shield or protector prevents the danger of the hook loosening by reason of the cutting or severing of the lashing or wrapping which secures it upon a snell, snood, leader, line, or the like, and it also insures to the person using the hook greater efficiency and durability, especially when the hook is poorly wrapped and there is danger of it pulling off when the wrapping loosens under a slight strain. It will be furthermore noted that the rubber tube will act as a lure to the fish when the hook is in use.

From the foregoing description, taken in connection with the accompanying drawings, the construction and operation of the invention will be readily understood without requiring a more extended explanation.

Various changes in the form, proportion, and the minor details of construction may be resorted to without departing from the invention or sacrificing any of the advantages of the invention as defined by the appended claims.

Having thus described my invention, what I claim as new, and desire to secure by Letters Patent, is—

1. A fish-hook, a line, a wrapping for securing said hook and line together, and a close-fitting sleeve entirely surrounding said wrapping for protecting the same.

2. A fish-hook, a line, a wrapping for securing said hook and line together, and a close-fitting sleeve entirely surrounding said wrapping and cemented thereto.

3. A fish-hook, a line, a wrapping for securing said hook and line together, and a close-fitting sleeve entirely surrounding said wrapping, said sleeve covering only that portion of the hook and line embraced by the wrapping.

In testimony whereof I have hereunto set my hand in presence of two subscribing witnesses.

J. E. BUCKINGHAM, JR.

Witnesses:
BENJ. G. COWL,
L. O. HILTON.